United States Patent
Lee et al.

(10) Patent No.: US 10,531,405 B2
(45) Date of Patent: *Jan. 7, 2020

(54) METHOD FOR TRIGGERING POWER HEADROOM REPORTING IN A DUAL CONNECTIVITY SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,495

(22) Filed: Dec. 7, 2018

(65) Prior Publication Data

US 2019/0116563 A1    Apr. 18, 2019

Related U.S. Application Data

(63) Continuation of application No. 15/492,179, filed on Apr. 20, 2017, now Pat. No. 10,172,103, which is a
(Continued)

(51) Int. Cl.
*H04W 52/36* (2009.01)
*H04W 24/10* (2009.01)
*H04W 52/34* (2009.01)

(52) U.S. Cl.
CPC ......... *H04W 52/365* (2013.01); *H04W 24/10* (2013.01); *H04W 52/34* (2013.01)

(58) Field of Classification Search
CPC .... H04W 52/365; H04W 24/10; H04W 52/34
See application file for complete search history.

(56) References Cited

U.S. PATENT DOCUMENTS

2011/0243016 A1*  10/2011  Zhang ............... H04W 52/365
                                                           370/252
2012/0207089 A1    8/2012  Kone
(Continued)

FOREIGN PATENT DOCUMENTS

| CN | 101895923 A | 11/2010 |
| WO | WO2011120448 | 10/2011 |
| WO | WO2014031998 | 2/2014 |

OTHER PUBLICATIONS

Ericsson, "Considerations on Power Control for Dual Connectivity," 3GPP TSG-RAN WG2 #84, Tdoc R2-134234, San Francisco, USA, Nov. 11-15, 2013, 5 pages.
(Continued)

*Primary Examiner* — Walli Z Butt
(74) *Attorney, Agent, or Firm* — Fish & Richardson P.C.

(57) ABSTRACT

A method for a User Equipment, UE, operating in a wireless communication system, includes triggering power headroom reports (PHRs), in a first Medium Access Control (MAC), entity and a second MAC entity when a first type event occurs in the second MAC entity, wherein the UE is configured with the first MAC entity corresponding to a first base station and the second MAC entity corresponding to a second base station for a radio bearer; triggering a PHR in the second MAC entity only, when a second type event occurs in the second MAC entity, wherein the first type event includes: there are uplink resources allocated for transmission on any cell of the second MAC entity and a required power backoff for the any cell of the second MAC entity has changed more than a threshold, or wherein the first type event includes: there is uplink transmission on any cell of the second MAC entity and a required power backoff for the any cell of the second MAC entity has changed more than a threshold.

12 Claims, 13 Drawing Sheets

Related U.S. Application Data continuation of application No. 14/657,749, filed on Mar. 13, 2015, now Pat. No. 9,655,066.

(60) Provisional application No. 61/952,876, filed on Mar. 14, 2014.

(56) References Cited

U.S. PATENT DOCUMENTS

| | | | |
|---|---|---|---|
| 2014/0056243 A1 | 2/2014 | Pelletier et al. | |
| 2014/0329551 A1* | 11/2014 | Ryoo | H04W 52/146 455/522 |
| 2015/0195796 A1 | 7/2015 | Sivanesan et al. | |
| 2015/0382311 A1* | 12/2015 | Kim | H04W 52/365 370/329 |
| 2016/0066284 A1* | 3/2016 | Kwon | H04W 52/365 370/329 |
| 2016/0234714 A1 | 8/2016 | Basu Mallick et al. | |

OTHER PUBLICATIONS

Intel Corporation, "PHR for Dual Connectivity," 3GPP TSG-RAN2 Meeting #85, R2-140283, Prague, Czech Republic, Feb. 10-14, 2014, 2 pages.

Nsn et al., "PHR for Dual Connectivity," 3GPP TSG-RAN WG2 Meeting #84, R2-140139 (Update of R2-134089), Prague, Czech Republic, Feb. 10-14, 2014, 7 pages.

Panasonic, "Uplink Transmission Power Management and PHR Reporting for Dual Connectivity," 3GPP TSG-RAN WG2 Meeting #84, R2-133945, San Francisco, USA, Nov. 11-15, 2013, 4 pages.

Pantech, "UL Transmission on Dual Connectivity," 3GPP TSG-RAN WG2 Meeting #82, R2-131802, Fukuoka, Japan, May 20-24, 2013. 9 pages.

Samsung, "Scheduling Information Handling in Inter-ENB Carrier Aggregation," 3GPP TSG-RAN WG2 Meeting #83bis, R2-133259, Ljubljana, Slovenia, Oct. 7-11, 2013, 3 pages.

3GPP, "3rd Generation Partnership Project; Technical Specification Group Radio Access Network; Study on Small Cell enhancements for E-UTRA and E-UTRAN; Higher layer aspects (Release 12)," 3GPP TR 36.842 V12.0.0, Dec. 2013, pp. 1-71.

LG Electronics Inc., "PHR Operation for Dual Connectivity," 3GPP TSG-RAN2 Meeting #85, R2-140742, Prague, Czech Republic, Feb. 10-14, 2014, pp. 1-3.

U.S. Appl. No. 15/492,179, filed Apr. 20, 2017.

U.S. Appl. No. 14/657,749, filed Mar. 13, 2015 (now U.S. Pat. No. 9,655,066).

Indian Office Action in Indian Application No. 201627027389, dated Oct. 18, 2019, 6 pages (with English translation).

* cited by examiner

FIG. 3
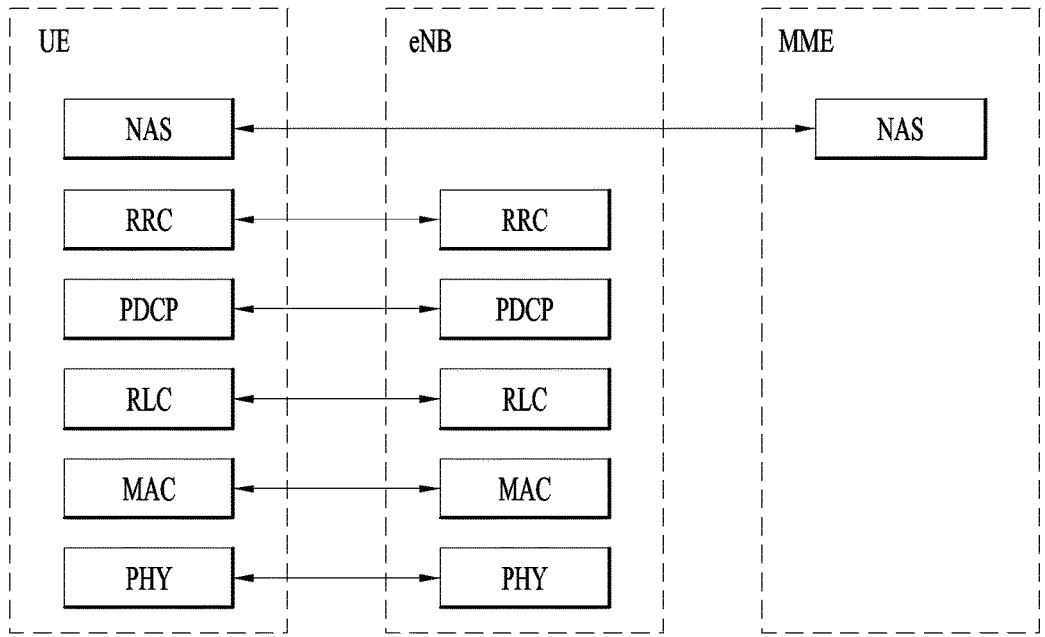
(a) Control-Plane Protocol Stack
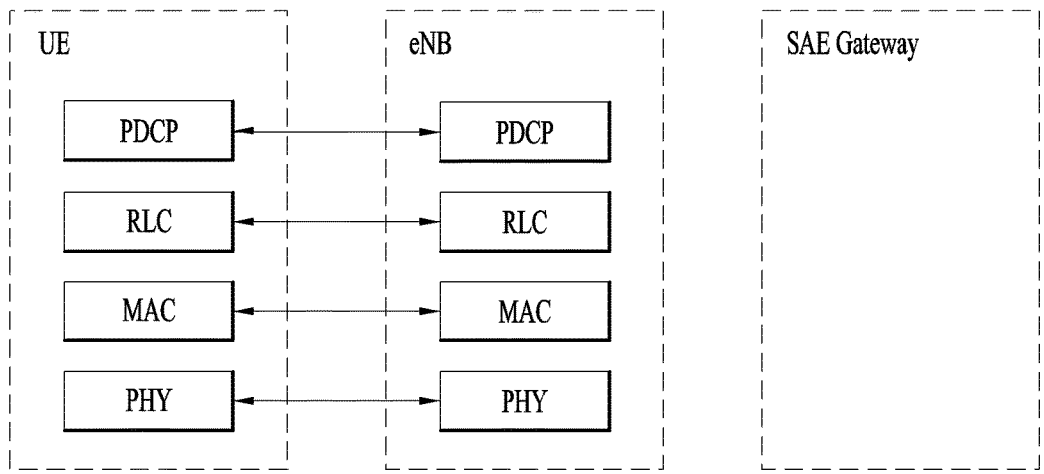
(b) User-Plane Protocol Stack (a) C-Plane connectivity of eNBs involved in dual connectivity (b) U-Plane connectivity of eNBs involved in dual connectivity

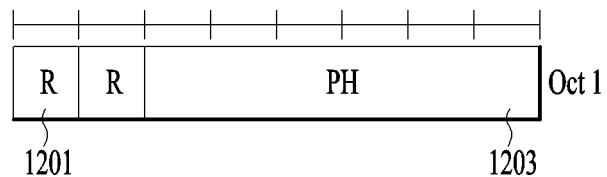
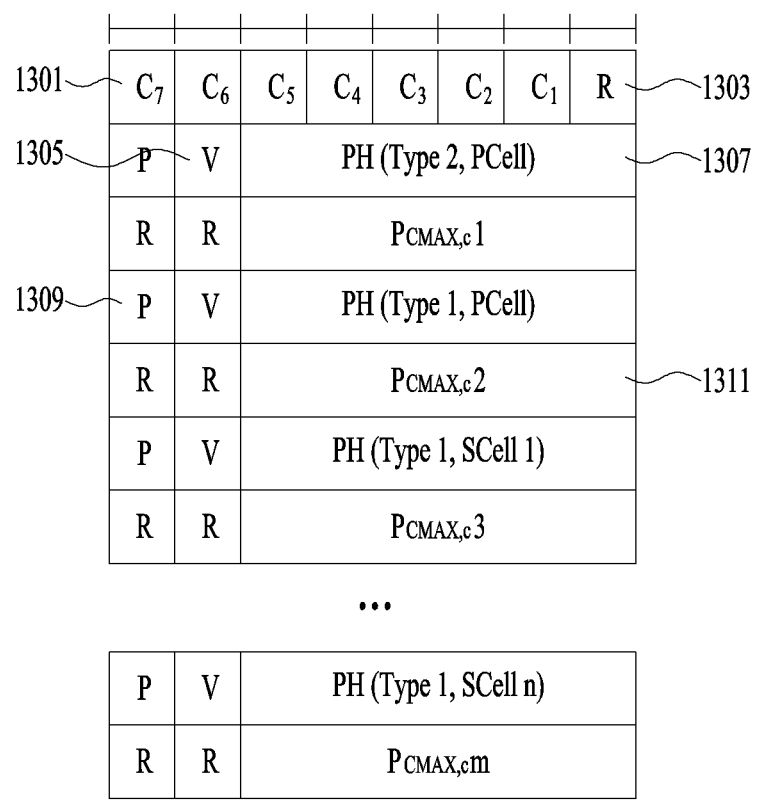

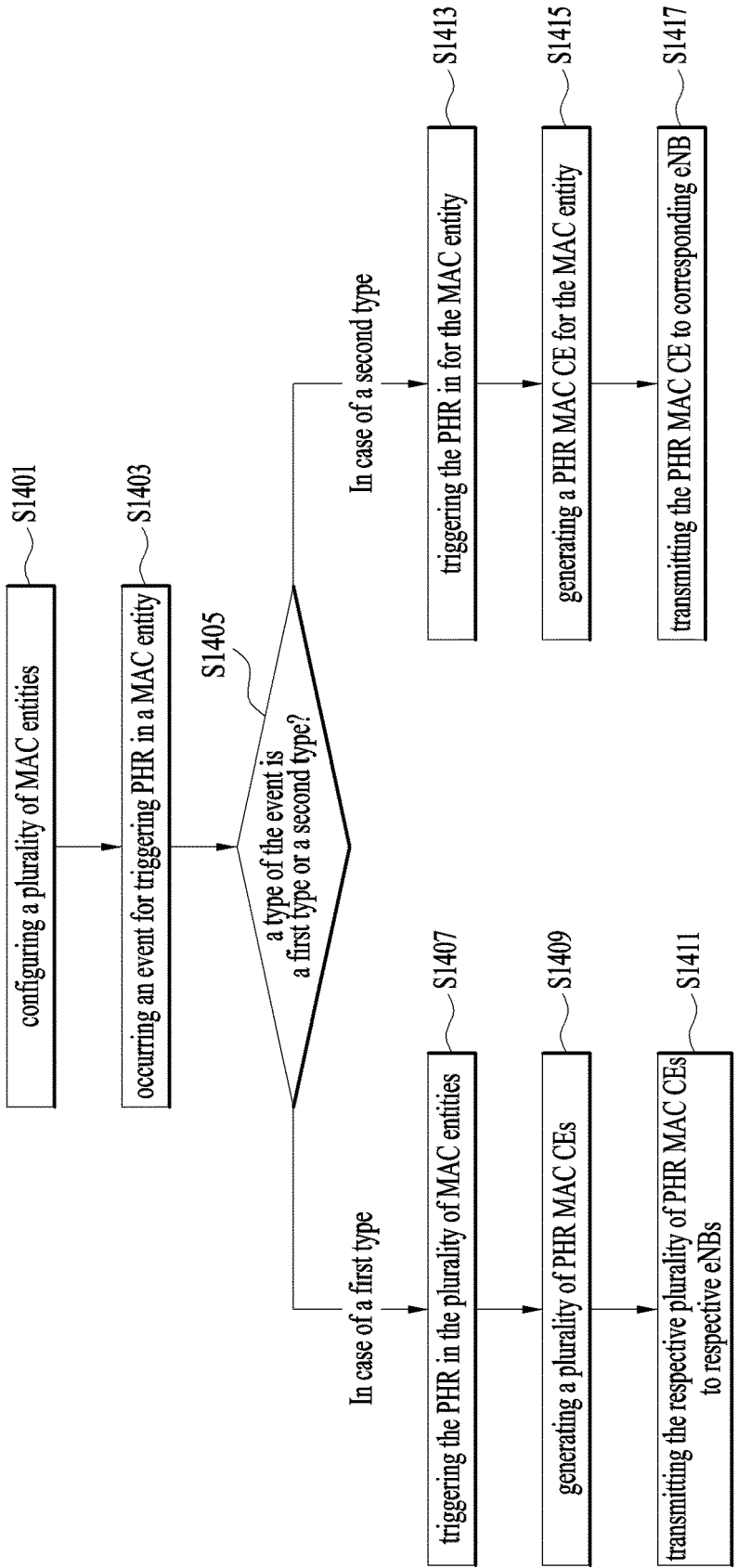

METHOD FOR TRIGGERING POWER HEADROOM REPORTING IN A DUAL CONNECTIVITY SYSTEM AND A DEVICE THEREFOR

CROSS-REFERENCE TO RELATED APPLICATIONS

This application is a Continuation of U.S. patent application Ser. No. 15/492,179 filed on Apr. 20, 2017, which is a Continuation of U.S. patent application Ser. No. 14/657,749 filed on Mar. 13, 2015 (now U.S. Pat. No. 9,655,066 issued on May 16, 2017), which claims the benefit of U.S. Provisional Application No. 61/952,876 filed on Mar. 14, 2014, all of which are hereby expressly incorporated by reference into the present application.

BACKGROUND OF THE INVENTION

Field of the Invention

The present invention relates to a wireless communication system and, more particularly, to a method for triggering power headroom reporting in a dual connectivity system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for a User Equipment (UE) operating in a wireless communication system, the method comprising: configuring a plurality of Medium Access Control (MAC) entities, each MAC entity corresponding to each enhanced-NodeB (eNB); occurring an event for triggering power headroom reporting (PHR) in a MAC entity of the plurality of MAC entities; triggering the PHR in the plurality of MAC entities including the MAC entity if a type of the event is a first type event; and triggering the PHR in the MAC entity if the type of the event is a second type event.

In another aspect of the present invention, provided herein is a method for a User Equipment (UE) operating in a wireless communication system, the method comprising: configuring a first Medium Access Control (MAC) entity and a second MAC entity; and triggering power headroom reporting (PHR) in the second MAC entity if a prohibit-PHR-timer for the first MAC entity expires In another aspect of the present invention, provided herein is a method for a User Equipment (UE) operating in a wireless communication system, the method comprising: configuring a first Medium Access Control (MAC) entity and a second MAC entity; and triggering power headroom reporting (PHR) in the second MAC entity if at least one SCell for the first MAC entity is changed from deactivate status to activate status.

Preferably, the first type event comprises at least one of the following events: a prohibitPHR-Timer of the MAC entity expires or has expired and path loss has changed since the last PHR is larger than a threshold, an SCell belonging to the MAC entity with configured uplink is activated, or the prohibitPHR-Timer of the MAC entity expires or has expired when the UE has UL resources for new transmission to a corresponding eNB.

Preferably, the second type event comprises at least one of the following events: a periodicPHR-Timer of the MAC entity expires, or upon configuration or reconfiguration of the power headroom reporting functionality for the MAC entity by upper layers, which is not used to disable the function.

Preferably, the first type event is related to cell status change.

Preferably, the first type event further comprises an event that a PSCell (Primary Secondary Cell) is added.

Preferably, the method further comprises: generating a plurality of PHR MAC CEs (Control Elements) if the type of the event is the first type event, wherein the each PHR MAC CE is for each MAC entity; and transmitting each of the plurality of PHR MAC CEs to respective eNBs.

Preferably, the method further comprises: generating a PHR MAC CE (Control Elements) for the MAC entity if the type of the event is the second type event; and transmitting the PHR MAC CE to corresponding eNB.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control-plane protocol stack and a user-plane protocol stack of a radio interface protocol between a UE and an E-UTRAN based on a 3rd generation partnership project (3GPP) radio access network standard;

FIG. 12 is a conceptual diagram for PHR MAC CE (Power Headroom Reporting MAC Control CE);

FIG. 13 is a conceptual diagram for Extended PHR MAC CE (Power Headroom Reporting MAC Control CE).

FIG. 14 is a conceptual diagram for triggering power headroom reporting in a dual connectivity system according to embodiments of the present invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
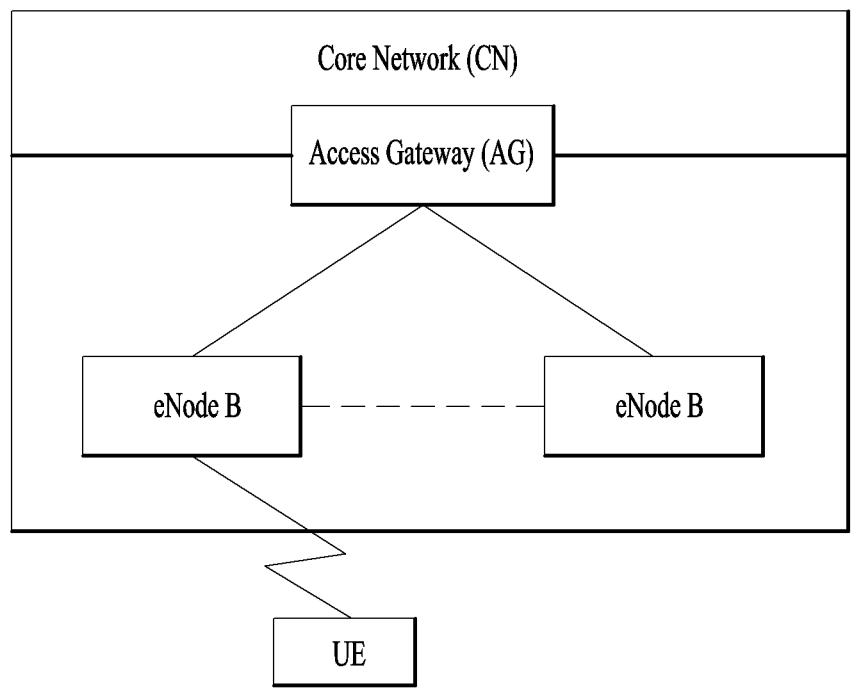
FIG. 1 is a diagram showing a network structure of an Evolved Universal Mobile Telecommunications System (E-UMTS) as an example of a wireless communication system.
Figure 2A:
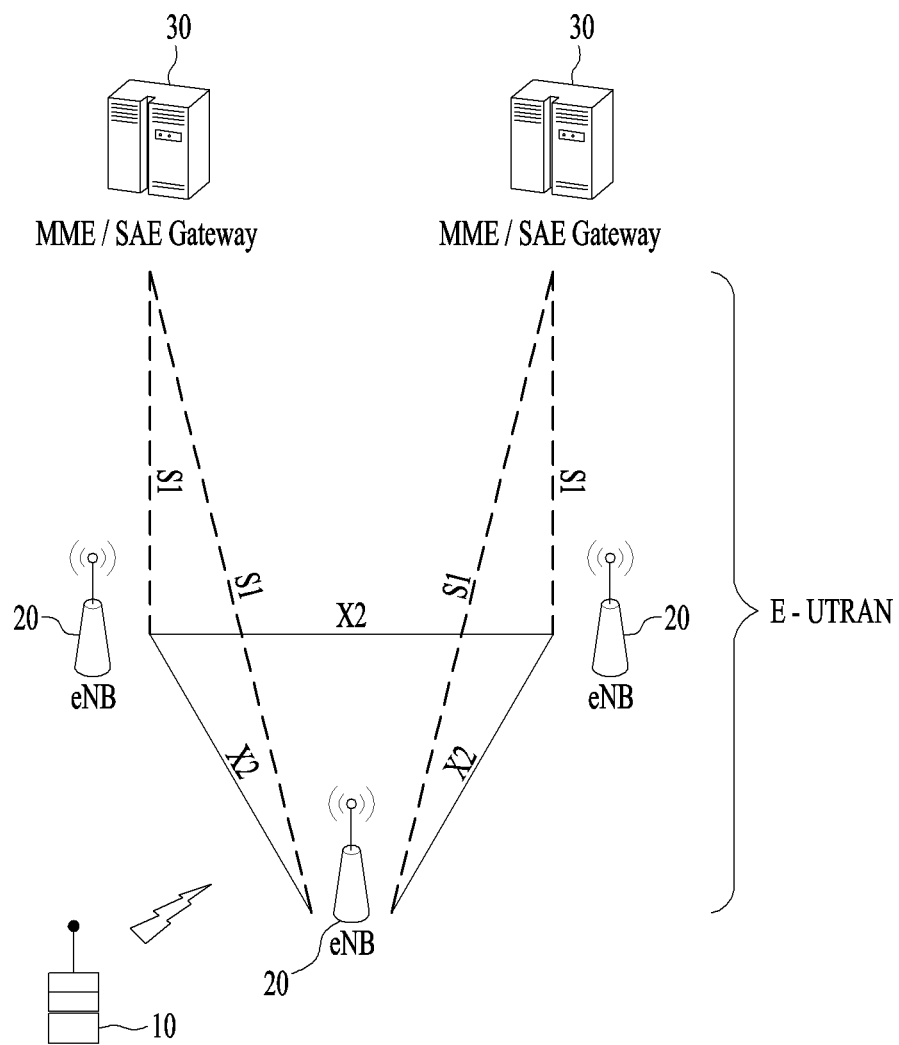
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
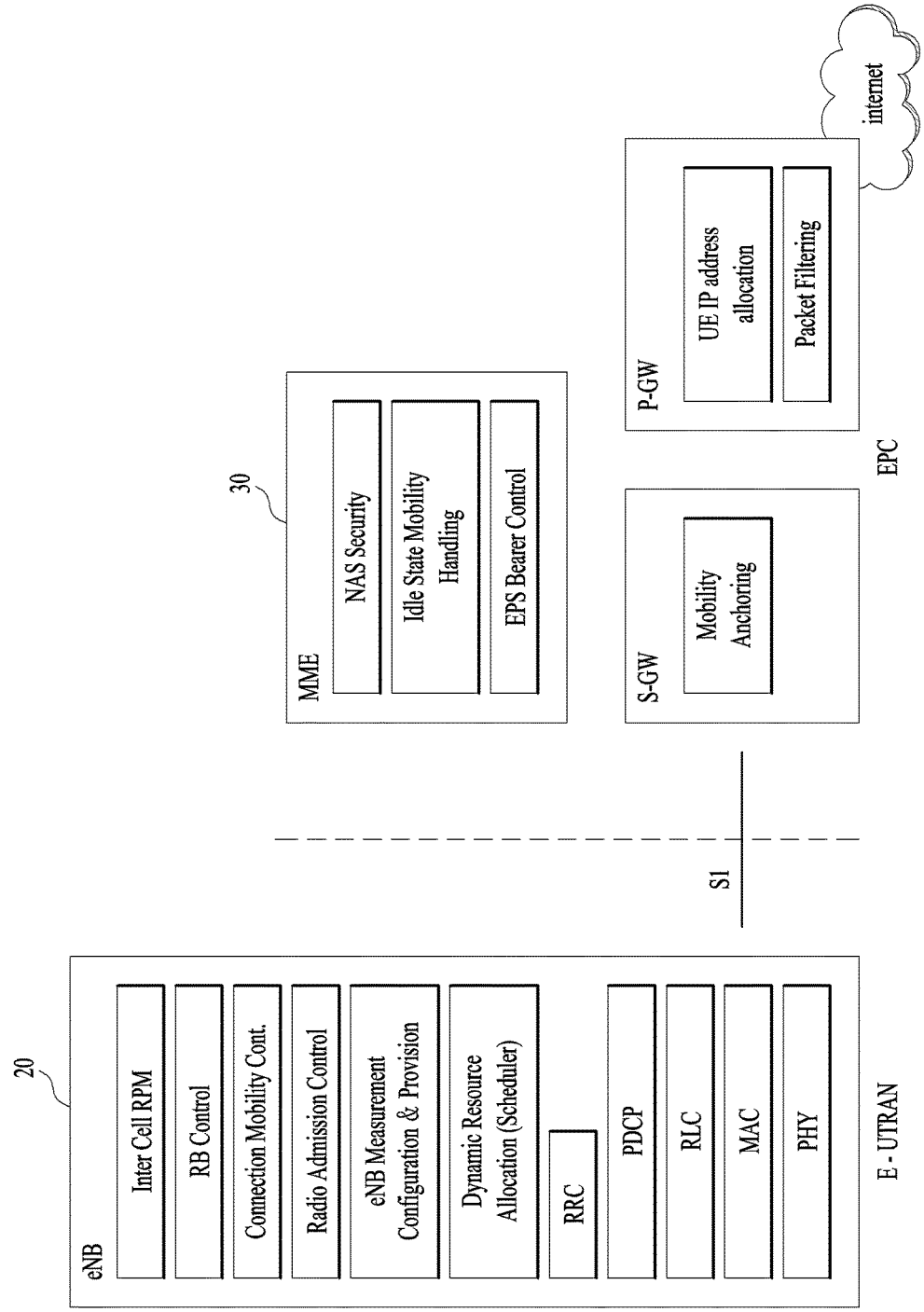
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control-plane protocol stack and a user plane protocol stack of a radio interface protocol between a UE and an E-UTRAN based on a 3GPP radio access network standard. As shown in FIG. 3(a), the control-plane protocol stack refers to a path used for transmitting control messages used for managing a call between the UE and the E-UTRAN. As shown in FIG. 3(b), the user-plane protocol stack refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
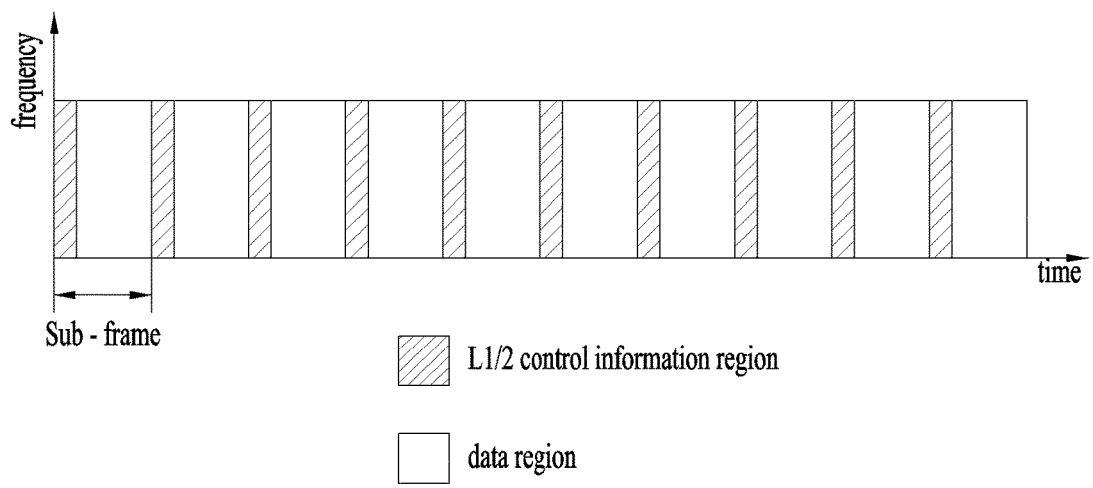
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
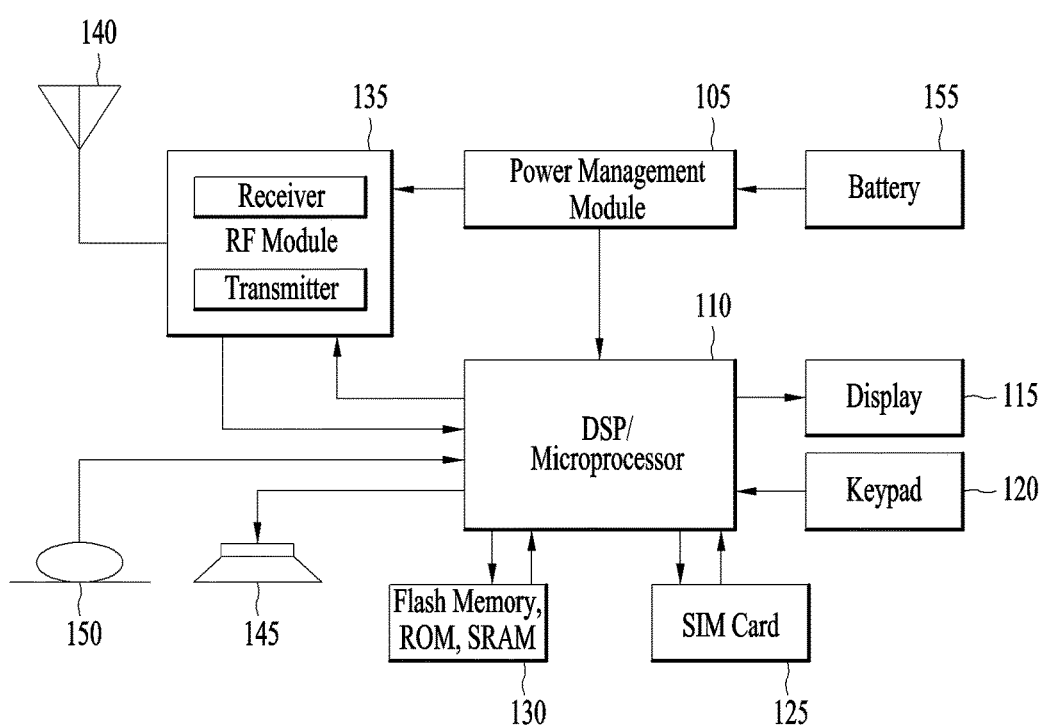
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
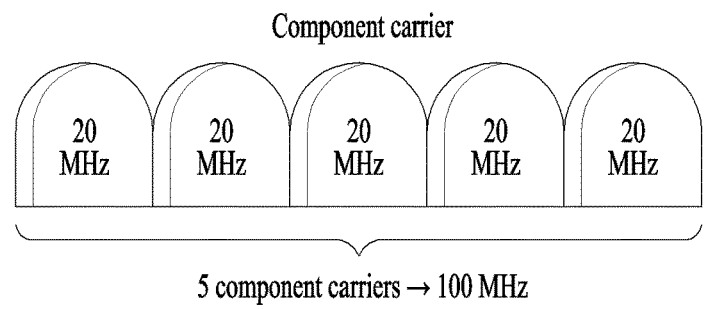
FIG. 6 is a diagram for carrier aggregation.

FIG. 6 is a diagram for carrier aggregation.

Carrier aggregation technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well.

In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 7:
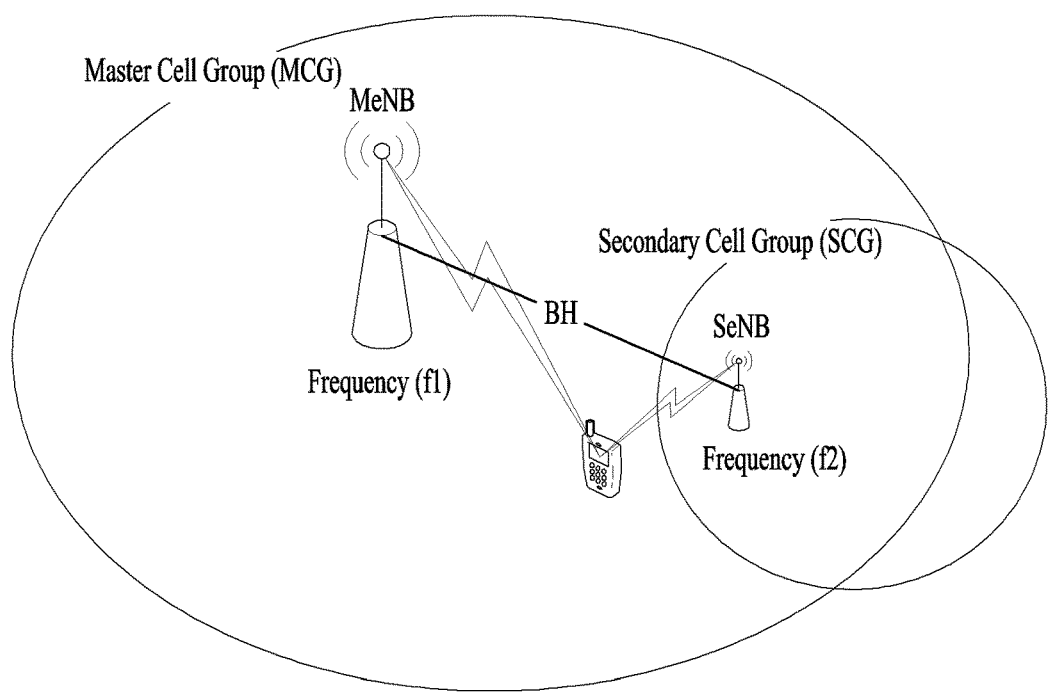
FIG. 7 is a conceptual diagram for dual connectivity between a Master Cell Group (MCG) and a Secondary Cell Group (SCG)

FIG. 7 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

Figure 10:
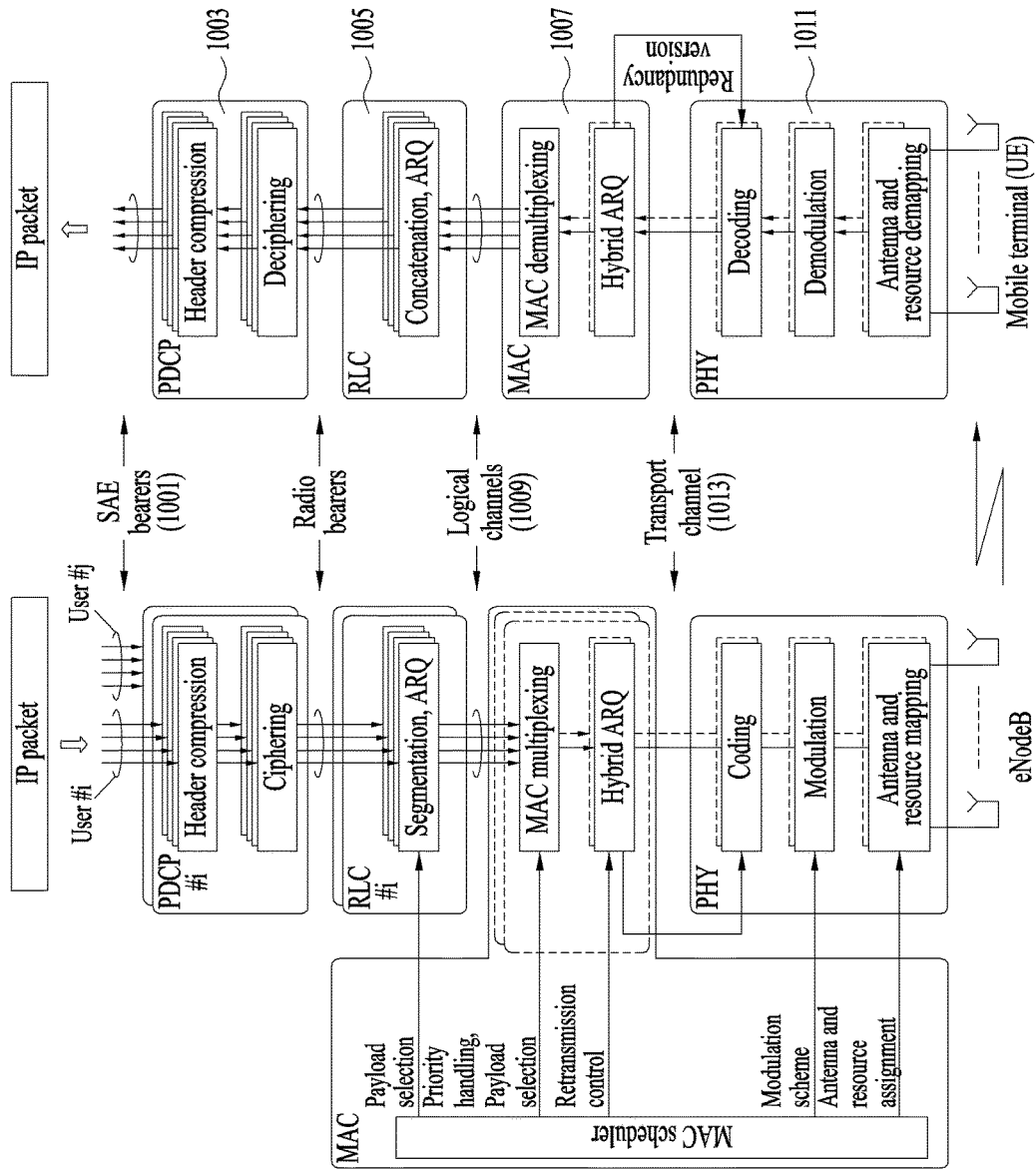
FIG. 10 is a diagram for a general overview of the LTE protocol architecture for the downlink.

The dual connectivity is a kind of carrier aggregation in that the UE is configured a plurality serving cells. However, unlike all serving cells supporting carrier aggregation of FIG. 8 are served by a same eNB, all serving cells supporting dual connectivity of FIG. 10 are served by different eNBs, respectively at same time. The different eNBs are connected via non-ideal backhaul interface because the UE is connected with the different eNBs at same time.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 8A:
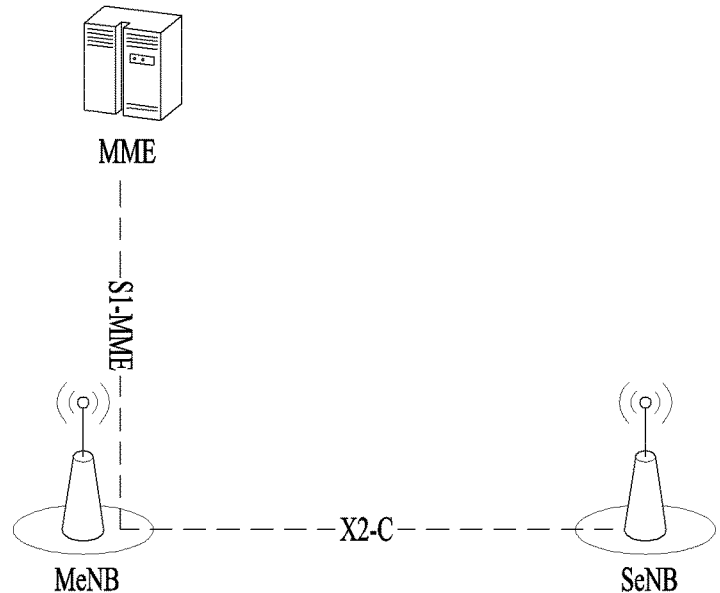
FIG. 8A is a conceptual diagram for C-Plane connectivity of base stations involved in dual connectivity.

FIG. 8A shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As FIG. 8a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 8B:
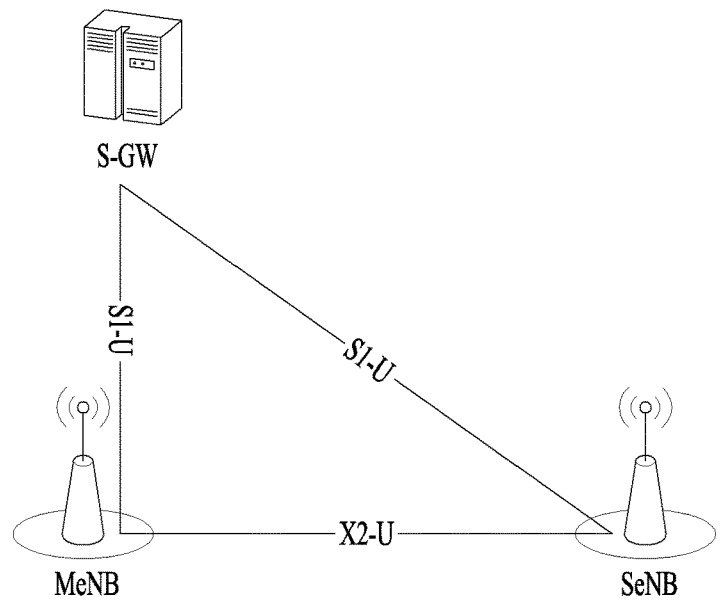
FIG. 8B is a conceptual diagram for U-Plane connectivity of base stations involved in dual connectivity.

FIG. 8B shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 9:
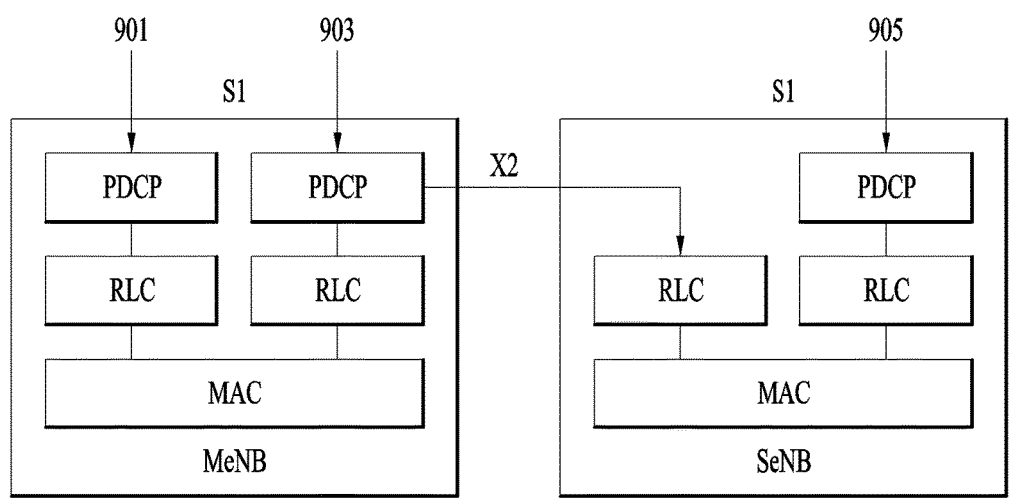
FIG. 9 is a conceptual diagram for radio protocol architecture for dual connectivity.

FIG. 9 is a conceptual diagram for radio protocol architecture for dual connectivity.

E-UTRAN of the present example can support dual connectivity operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (901), split bearer (903) and SCG bearer (905). Those three alternatives are depicted on FIG. 9. The SRBs (Signaling Radio Bearers) are always of the MCG bearer and therefore only use the radio resources provided by the MeNB. The MCG bearer (901) is a radio protocol only located in the MeNB to use MeNB resources only in the dual connectivity. And the SCG bearer (905) is a radio protocol only located in the SeNB to use SeNB resources in the dual connectivity.

Specially, the split bearer (903) is a radio protocol located in both the MeNB and the SeNB to use both MeNB and SeNB resources in the dual connectivity and the split bearer (903) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer (903) are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

The expected drawbacks of the split bearer (903) are: i) need to route, process and buffer all dual connectivity traffic in the MeNB, ii) a PDCP entity to become responsible for routing PDCP PDUs towards eNBs for transmission and reordering them for reception, iii) flow control required between the MeNB and the SeNB, iv) in the uplink, logical channel prioritization impacts for handling RLC retransmissions and RLC Status PDUs (restricted to the eNB where the corresponding RLC entity resides) and v) no support of local break-out and content caching at SeNB for dual connectivity UEs.

In dual connectivity, two MAC entities are configured in the UE: one for the MCG and one for the SCG. Each MAC entity is configured by RRC with a serving cell supporting PUCCH transmission and contention based Random Access. The term SpCell refers to such cell, whereas the term SCell refers to other serving cells. The term SpCell either refers to the PCell of the MCG or the PSCell (Primary Secondary Cell) of the SCG depending on if the MAC entity is associated to the MCG or the SCG, respectively. A Timing Advance Group containing the SpCell of a MAC entity is referred to as pTAG, whereas the term sTAG refers to other TAGs.

The functions of the different MAC entities in the UE operate independently if not otherwise indicated. The timers and paramenters used in each MAC entity are configured independently if not otherwise indicated. The serving cells, C-RNTI, radio bearers, logical channels, upper and lower layer entities, LCGs, and HARQ entities considered by each MAC entity refer to those mapped to that MAC entity if not otherwise indicated.

FIG. 10 is a diagram for a general overview of the LTE protocol architecture for the downlink.

A general overview of the LTE protocol architecture for the downlink is illustrated in FIG. 10. Furthermore, the LTE protocol structure related to uplink transmissions is similar to the downlink structure in FIG. 10, although there are differences with respect to transport format selection and multi-antenna transmission.

Data to be transmitted in the downlink enters in the form of IP packets on one of the SAE bearers (1001). Prior to transmission over the radio interface, incoming IP packets are passed through multiple protocol entities, summarized below and described in more detail in the following sections:

Packet Data Convergence Protocol (PDCP, 1003) performs IP header compression to reduce the number of bits necessary to transmit over the radio interface. The header-compression mechanism is based on ROHC, a standardized header-compression algorithm used in WCDMA as well as several other mobile-communication standards. PDCP (1003) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 1005) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1005) offers services to the PDCP (1003) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 1007) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1007) offers services to the RLC (1005) in the form of logical channels (1009).

Physical Layer (PHY, 1011), handles coding/decoding, modulation/demodulation, multi-antenna mapping, and other typical physical layer functions. The physical layer (1011) offers services to the MAC layer (1007) in the form of transport channels (1013).

Figure 11:
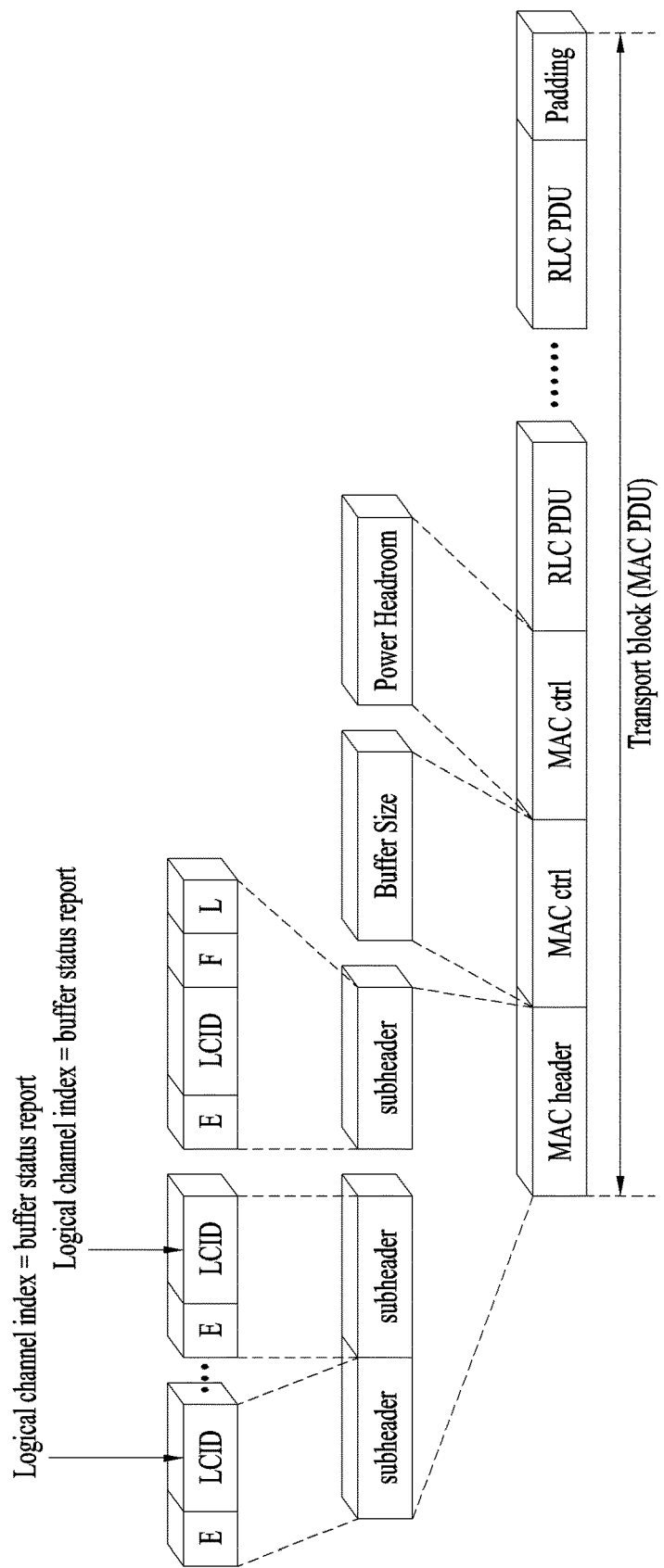
FIG. 11 is a diagram for signaling of buffer status and power-headroom reports.

FIG. 11 is a diagram for signaling of buffer status and power-headroom reports.

The scheduler needs knowledge about an amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCD field in one of the MAC subheaders is set to a reserved value indicating the presence of a buffer status report, as illustrated in FIG. 11.

Especially, to assist the scheduler in the selection of a combination of modulation-and-coding scheme and resource size M that does not lead to the terminal being power limited, the terminal can be configured to provide regular power headroom reports on its power usage. There is a separate transmit-power limitation for each component carrier. Thus, power headroom should be measured and reported separately for each component carrier.

There are two different Types of power-headroom reports defined for LTE release 10, Type 1 and Type 2. Type 1 reporting reflects the power headroom assuming PUSCH-only transmission on the carrier, while the Type2 report assumes combined PUSCH and PUCCH transmission.

The Type1 power headroom valid for a certain subframe, assuming that the terminal was really scheduled for PUSCH transmission in that subframe, is given by the following expression:

$$\text{Power Headroom} = P_{CMAX,c} - (P_{0,PUSCH} + \alpha \cdot PL_{DL} + 10 \cdot \log_{10}(M) + \Delta_{MCS}\delta), \quad \text{[Equation 1]}$$

Where the values for M and ΔMCS correspond to the resource assignment and modulation-and-coding scheme used in the subframe to which the power-headroom report corresponds. It can be noted that the power headroom is not a measure of the difference between the maximum per-carrier transmit power and the actual carrier transmit power. It can be seen that the power headroom is a measure of the difference between PCMAX,c and the transmit power that would have been used assuming that there would have been no upper limit on the transmit power. Thus, the power headroom can very well be negative. More exactly, a negative power headroom indicates that the per-carrier transmit power was limited by PCMAX,cat the time of the power headroom reporting. As the network knows what modulation-and-coding scheme and resource size the terminal used for transmission in the subframe to which the power-headroom report corresponds, it can determine what are the valid combinations of modulation-and-coding scheme and resource size M, assuming that the downlink path loss PLDLand the term δ have not changed substantially.

Type 1 power headroom can also be reported for subframes where there is no actual PUSCH transmission. In such cases, 10·log 10 (M) and ΔMCS in the expression above are set to zero:

$$\text{Power Headroom} = P_{CMAX,c} - (P_{0,PUSCH} + \alpha \cdot PL_{DL} + \delta). \quad \text{[Equation 2]}$$

This can be seen as the power headroom assuming a default transmission configuration corresponding to the minimum possible resource assignment (M=1) and the modulation-and-coding scheme associated with Δ MCS=0 dB.

Similarly, Type2 power headroom reporting is defined as the difference between the maximum per-carrier transmit power and the sum of the PUSCH and PUCCH transmit power respectively, once again not taking into account any maximum per-carrier power when calculating the PUSCH and PUCCH transmit power.

Similar to Type1 power headroom reporting, the Type2 power headroom can also be reported for subframes in which no PUSCH and/or PUCCH is transmitted. In that case a virtual PUSCH and or PUCCH transmit power is calculated, assuming the smallest possible resource assignment (M=1) and Δ MCS=0 dB for PUSCH and Δ Format=0 for PUCCH.

For the uplink, the power availability, or power headroom is defined as the difference between the nominal maximum output power and the estimated output power for UL-SCH transmission. This quantity can be positive as well as negative (on a dB scale), where a negative value would indicate that the network has scheduled a higher data rate than the terminal can support given its current power availability. The power headroom depends on the power-control mechanism and thereby indirectly on factors such as the interference in the system and the distance to the base stations.

Information about the power headroom is fed back from the terminals to the eNodeB in a similar way as the buffer-status reports—that is, only when the terminal is scheduled to transmit on the UL-SCH. Type1 reports are provided for all component carriers simultaneously, while Type2 reports are provided for the primary component carrier only.

The PHR trigger events are defined for a MAC entity as follows:

Event 1: prohibitPHR-Timer expires or has expired and the path loss has changed more than dl-PathlossChange dB for at least one activated Serving Cell which is used as a pathloss reference since the last transmission of a PHR when the UE has UL resources for new transmission;

Event 2: periodicPHR-Timer expires;

Event 3: upon configuration or reconfiguration of the power headroom reporting functionality by upper layers, which is not used to disable the function;

Event 4: activation of an SCell with configured uplink.

Event 5: prohibitPHR-Timer expires or has expired, when the UE has UL resources for new transmission, and the following is true in this TTI for any of the active Serving Cells with configured uplink: there are UL resources allocated for transmission or there is a PUCCH transmission on this cell, and the required power backoff due to power management (as allowed by P-MPR$_c$) for this cell has changed more than dl-PathlossChange dB since the last transmission of a PHR when the UE had UL resources allocated for transmission or PUCCH transmission on this cell.

FIG. 12 is a conceptual diagram for PHR MAC CE (Power Headroom Reporting MAC Control CE).

The Power Headroom MAC control element is identified by a MAC PDU subheader with LCID as specified in Table 1. It has a fixed size and consists of a single octet defined as follows by Table 2.

TABLE 1

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding. |

TABLE 2

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63. |

A field of R (1201) is a reserved bit and is set to "0". And a field of PH (1203) indicates the power headroom level. A length of the field of PH (1203) is 6 bits. The reported PH and the corresponding power headroom levels are shown in Table 2 above.

FIG. 13 is a conceptual diagram for Extended PHR MAC CE (Power Headroom Reporting MAC Control CE).

The Extended Power Headroom MAC control element is identified by a MAC PDU subheader with LCD as specified in the Table 1 above. It has a variable size and is defined in FIG. 12. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the Serving CellIndex an octet with the Type 1 PH field and an octet with the associated PCMAX,c field (if reported), for the PCell and for each SCell indicated in the bitmap.

The Extended Power Headroom MAC Control Element is defined as follows:

A field of 'Ci' (1301) indicates the presence of a PH field for the SCell with SCell index i. The Ci field set to "1" indicates that a PH field for the SCell with SCell index i is reported. The Ci field set to "0" indicates that a PH field for the SCell with SCell index i is not reported;

A field of 'R' (1303) is a reserved bit and is set to "0";

A field of 'V' (1305) indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

A field of 'PH' (1307) indicates the power headroom level. The length of the field is 6 bits. The reported PH and the corresponding power headroom levels are shown in Table 2

A field of 'P' (1309) indicates whether the UE applies power backoff due to power management as allowed by P-MPR$_c$. The UE shall set P=1 if the corresponding $P_{CMAX,c}$ field would have had a different value if no power backoff due to power management had been applied;

A field of '$P_{CMAX,c}$'(1311) if present, this field indicates the $P_{CMAX,c}$ or $\tilde{P}_{CMAX,c}$ used for calculation of the preceding PH field. The reported $P_{CMAX,c}$ and the corresponding nominal UE transmit power levels are shown in Table 3.

If the UE has UL resources allocated for new transmission for a TTI and if the UE is configured to simultaneous PUCCH-PUSCH transmission, the Extended Power Headroom MAC Control Element includes a value of a Type 2 power headroom for the cell in the field of PH in a TTI. In this case, if the UE has a PUCCH transmission in the TTI, the Extended Power Headroom MAC Control Element includes a value of the corresponding $P_{CMAX,c}$ field from a physical layer;

TABLE 3

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63. |

The UE reports the power headroom (PH) information to the eNB in order for the eNB to allocate more resource to the UE unless the allocated resource do not exceed the amount of resource that UE can support given the UE's maximum transmission power. In detail, the UE reports all activated serving cells configured for the UE to the eNB using MAC signaling, i.e., PHR MAC CE. When the UE reports the PH information of cells to the corresponding eNB, as the eNB is aware of the scheduling information as well as the power headroom of the UE, the eNB can assess the exact power status of the UE.

In dual connectivity, as the UE is connected to more than one eNBs and scheduled by them, the UE has separate MAC entities correspond to each eNB. Thus, PHR operation is re-considered in the following aspects: PHR configuration, PHR triggering, PHR transmission.

1) PHR configuration: as each eNB has different radio environment and scheduling policy, PHR operation is independently performed by configuring PHR parameters such as periodicPHR-Timer, prohibitPHR-Timer, and dl-PathlossChange per MAC entity.

2) PHR transmission: in dual connectivity, it is generally assumed that exchanging scheduling information between different eNBs over X2 non-ideal backhaul in real time would not be possible. Without the latest scheduling information of other eNB, the PH information of serving cells under control of other eNB might not be so useful because PH information cannot be understood or interpreted precisely without scheduling information. However, as the UE has limited power in uplink, PH information of serving cells of other eNB is still considered as useful as long as it provides any rough information on power status in UE. Therefore, in dual connectivity, when reporting PH to one eNB, the PH information of all activated serving cells is included in the PHR MAC CE.

3) PHR triggering: currently, PHR is triggered by five events as specified in above mentioned. As PHR itself can be seen as overhead, PHR should not be transmitted wastefully. Thus, it can be considered as natural to trigger PHR only in the MAC entity where the serving cell where PHR trigger event is met is belonging to. If PHR is triggered in one MAC entity, it does not necessarily mean that PHR should be triggered in other MAC entity. On the other hand, if PHR is triggered in one MAC entity, it may imply that power status in the serving cells in other eNB.

FIG. 14 is a conceptual diagram for triggering power headroom reporting in a dual connectivity system according to embodiments of the present invention.

For a UE configured with at least two MAC entities to connect to at least two eNBs, i.e., one MAC entity for one eNB, in order to avoid excessive PHR transmission by the UE, it is invented that when a PHR trigger event occurs in one MAC entity, the PHR is triggered in the MAC entity or in all MAC entities depending on the type of PHR trigger event. In detail, if PHR trigger event belongs to the first type, the PHR is triggered in the MAC entity where the PHR trigger event occurs. Otherwise, if PHR trigger event belongs to the second type, the PHR is triggered in all MAC entities configured to the UE.

In detail, the UE configures a plurality of MAC entities (S1401), each MAC entity corresponding to each eNB.

When an event for triggering PHR in a MAC entity of the plurality of MAC entities (S1403) occurs, the UE checks whether a type of the event for triggering PHR in a MAC entity is a first type or a second type (S1405).

If the type of the event is the first type event, the PHR is triggered in the plurality of MAC entities (S1407). And a plurality of PHR MAC CEs is generated, wherein the each PHR MAC CE is for each MAC entity (S1409). The respective plurality of PHR MAC CEs is transmitted to respective eNBs (S1411).

Preferably, the first type comprises i) a prohibitPHR-Timer of the MAC entity expires or the prohibitPHR-Timer of the MAC entity has expired and the path loss has changed more than dl-PathlossChange dB for at least one activated Serving Cell belonging to the MAC entity which is used as a pathloss reference since the last transmission of a PHR for the corresponding eNB when the UE has UL resources for new transmission (Event 1), ii) an SCell belonging to the MAC entity with configured uplink is activated (Event 4), and iii) the prohibitPHR-Timer of the MAC entity has expired when the UE has UL resources for new transmission to a corresponding eNB and the following is true in this TTI for any of the activated Serving Cells belonging to the MAC entity with configured uplink (Event 5): there are UL resources allocated for transmission or there is a PUCCH transmission on this cell, and the required power backoff due to power management (as allowed by P-MPR$_c$) for this cell has changed more than dl-PathlossChange dB since the last transmission of a PHR to the corresponding eNB when the UE had UL resources allocated for transmission or PUCCH transmission on this cell.

Preferably, the first type event is related to cell status change.

Preferably, the first type event is further comprises addition of a PSCell. Because the PSCell is also SCell, that the PSCell is added is corresponding to that the SCell belonging to the MAC entity with configured uplink is activated. That is, Event 4 can include the case that PSCell is added. The PSCell is added after the PSCell is activated.

If the type of the event is the second type event, the PHR is triggered in the MAC entity (S1413). And a PHR MAC CE is generated for the MAC entity (S1415). The generated PHR MAC CEs is transmitted to corresponding eNB (S1417).

Preferably, the second type comprises i) a periodicPHR-Timer of the MAC entity expires (Event 2) and ii) upon configuration or reconfiguration of the power headroom reporting functionality for the MAC entity by upper layers, which is not used to disable the function (Event 3).

Figure 15:
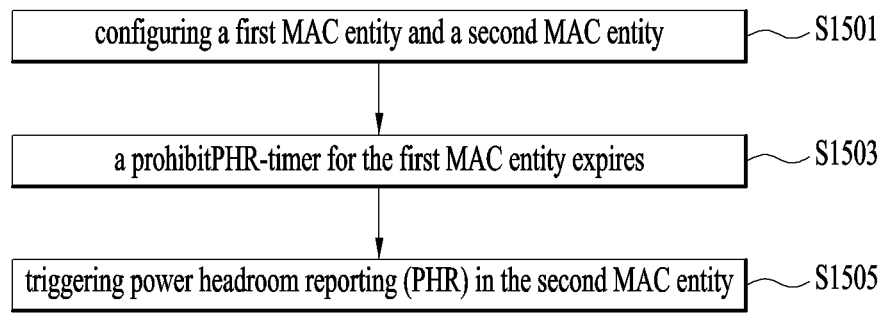
FIGS. 15 and 16 are conceptual diagrams for triggering power headroom reporting corresponding to a first type according to embodiments of the present invention.
Figure 16:
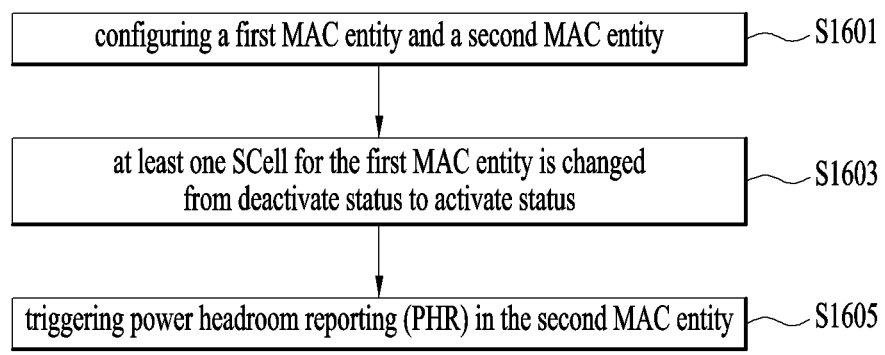

FIGS. 15 and 16 are conceptual diagrams for triggering power headroom reporting corresponding to a first type according to embodiments of the present invention.

In case of the first type, the PHR is triggered in all MAC entities configured to the UE when an event for triggering the PHR occurs in a MAC entity (steps of S1403 to S1407).

Thus, in case that the UE configures a first MAC entity and a second MAC entity (S1501), the UE triggers PHR in the second MAC entity as well as in the first MAC entity (S1505) if a prohibitPHR-timer for the first MAC entity expires (S1503).

Thus, in case that the UE configures a first MAC entity and a second MAC entity (S1601), the UE triggers PHR in the second MAC entity as well as in the first MAC entity (S1605) if at least one SCell for the first MAC entity is changed from deactivate status to activate status (S1603).

In conclusion, a power headroom report (PHR) shall be triggered if any of the following events occur:

i) prohibitPHR-Timer expires or has expired and the path loss has changed more than dl-PathlossChange dB for at least one activated serving cell of 'any MAC entity' which is used as a pathloss reference since the last transmission of a PHR in this MAC entity when the MAC entity has UL resources for new transmission;

ii) periodicPHR-Timer expires;

iii) upon configuration or reconfiguration of the power headroom reporting functionality by upper layers, which is not used to disable the function;

iv) activation of an SCell of 'any MAC entity' with configured uplink;

v) addition of the PSCell; and vi) prohibitPHR-Timer expires or has expired, when the MAC entity has UL resources for new transmission, and the following is true in this TTI for any of the activated serving cells of 'any MAC entity' with configured uplink: there are UL resources allocated for transmission or there is a PUCCH transmission on this cell, and the required power backoff due to power management (as allowed by P-MPR$_c$) for this cell has changed more than dl-PathlossChange dB since the last transmission of a PHR when the MAC entity had UL resources allocated for transmission or PUCCH transmission on this cell.

Because the PHR is performed independently in unit of MAC entity, respective PHR is performed independently unless the condition of 'any MAC entity' is attached. For example, when the periodicPHR-Timer for first MAC entity expires, the PHR is triggered in only the first MAC entity. Otherwise, when prohibitPHR-Timer for the first MAC entity expires, the PHR is triggered in all MAC entities.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method performed by a User Equipment (UE) operating in a wireless communication system, the UE configured with a first Medium Access Control (MAC) entity corresponding to a first base station and a second MAC entity corresponding to a second base station for a radio bearer, the method comprising:
    triggering, based on a first type event occurring in the second MAC entity, (i) a first power headroom report (PHR) in the first MAC entity, and (ii) a second PHR in the second MAC entity; and
    transmitting the first PHR triggered by the first MAC entity to the first base station and transmitting the second PHR triggered by the second MAC entity to the second base station,
    wherein the first type event comprises:
        a change in a power backoff for any cell of the second MAC entity exceeding a threshold, and
        (i) uplink resources being allocated for transmission on the any cell of the second MAC entity, or (ii) uplink transmission occurring on the any cell of the second MAC entity,
        wherein the change in the power backoff for the any cell of the second MAC entity is determined since a last transmission of a PHR in which (i) uplink resources were allocated for transmission on the any cell of the second MAC entity, or (ii) uplink transmission occurred on the any cell of the second MAC entity.

2. The method of claim 1, further comprising:
    triggering, based on a second type event occurring in the second MAC entity, the second PHR in the second MAC entity only,
    wherein the second type event comprises at least one of the following events: (i) expiration of a periodicPHR-Timer of the second MAC entity, or (ii) configuration or reconfiguration of a power headroom reporting functionality for the second MAC entity by upper layers.

3. The method of claim 1, further comprising:
    triggering, based on a second type event occurring in the first MAC entity, the first PHR in the first MAC entity only,
    wherein the second type event comprises at least one of the following events: (i) expiration of a periodicPHR-Timer of the first MAC entity, or (ii) configuration or reconfiguration of a power headroom reporting functionality for the first MAC entity by upper layers.

4. The method of claim 1, wherein transmitting the first PHR triggered by the first MAC entity to the first base station and transmitting the second PHR triggered by the second MAC entity to the second base station comprises:
    generating a first PHR MAC control element (CE) for the first MAC entity and a second PHR MAC CE for the second MAC entity; and
    transmitting the first PHR MAC CE to the first base station and transmitting the second PHR MAC CE to the second base station.

5. The method of claim 1, wherein the first PHR comprises information regarding a difference between (i) a nominal UE maximum transmit power a cell of the first MAC entity, and (ii) an estimated power for uplink transmission on the cell of the first MAC entity, and
    wherein the second PHR comprises information regarding a difference between (i) a nominal UE maximum transmit power on a cell of the second MAC entity, and (ii) an estimated power for uplink transmission on the cell of the second MAC entity.

6. The method of claim 1, wherein the radio bearer is a split radio bearer comprising a Packet Data Convergence Protocol (PDCP) entity and the first MAC entity and the second MAC entity.

7. A User Equipment (UE) configured to operate in a wireless communication system, the UE configured with a first Medium Access Control (MAC) entity corresponding to a first base station and a second MAC entity corresponding to a second base station for a radio bearer, the UE comprising:
    at least one radio-frequency (RF) module;
    at least one processor; and
    at least one computer memory operably connectable to the at least one processor and storing instructions that, when executed, cause the at least one processor to perform operations comprising:
        triggering, based on a first type event occurring in the second MAC entity, (i) a first power headroom report (PHR) in the first MAC entity, and (ii) a second PHR in the second MAC entity; and
        controlling the at least one RF module to transmit the first PHR triggered by the first MAC entity to the first base station and to transmit the second PHR triggered by the second MAC entity to the second base station,
    wherein the first type event comprises:
        a change in a power backoff for any cell of the second MAC entity exceeding a threshold, and
        (i) uplink resources being allocated for transmission on the any cell of the second MAC entity, or (ii) uplink transmission occurring on the any cell of the second MAC entity,
        wherein the change in the power backoff for the any cell of the second MAC entity is determined since a last transmission of a PHR in which (i) uplink resources were allocated for transmission on the any cell of the second MAC entity, or (ii) uplink transmission occurred on the any cell of the second MAC entity.

8. The UE of claim 7, wherein the operations further comprise:
    triggering, based on a second type event occurring in the second MAC entity, the second PHR in the second MAC entity only,
    wherein the second type event comprises at least one of the following events: (i) expiration of a periodicPHR-Timer of the second MAC entity, or (ii) configuration or reconfiguration of a power headroom reporting functionality for the second MAC entity by upper layers.

9. The UE of claim 7, wherein the operations further comprise:
    triggering, based on a second type event occurring in the first MAC entity, the first PHR in the first MAC entity only, wherein the second type event comprises at least one of the following events: (i) expiration of a periodicPHR-Timer of the first MAC entity, or (ii) configuration or reconfiguration of a power headroom reporting functionality for the first MAC entity by upper layers.

10. The UE of claim 7, wherein controlling the at least one RF module to transmit the first PHR triggered by the first MAC entity to the first base station and to transmit the second PHR triggered by the second MAC entity to the second base station comprises:

generating a first PHR MAC control element (CE) for the first MAC entity and a second PHR MAC CE for the second MAC entity; and controlling the at least one RF module to transmit the first PHR MAC CE to the first base station and to transmit the second PHR MAC CE to the second base station.

11. The UE of claim 7, wherein the first PHR comprises information regarding a difference between (i) a nominal UE maximum transmit power a cell of the first MAC entity, and (ii) an estimated power for uplink transmission on the cell of the first MAC entity, and wherein the second PHR comprises information regarding a difference between (i) a nominal UE maximum transmit power on a cell of the second MAC entity, and (ii) an estimated power for uplink transmission on the cell of the second MAC entity.

12. The UE of claim 7, wherein the radio bearer is a split radio bearer comprising a Packet Data Convergence Protocol (PDCP) entity and the first MAC entity and the second MAC entity.

* * * * *